United States Patent [19]

Schaffer et al.

[11] 4,187,026

[45] Feb. 5, 1980

[54] PHOTOACOUSTIC METHOD AND APPARATUS FOR MEASURING INTENSITY OF ELECTROMAGNETIC RADIATION

[75] Inventors: Arnold M. Schaffer; John A. Favre, both of Bartlesville, Okla.

[73] Assignee: Phillips Petroleum Company, Bartlesville, Okla.

[21] Appl. No.: 838,030

[22] Filed: Sep. 29, 1977

[51] Int. Cl.² ............................................. G01J 3/28
[52] U.S. Cl. ................................... 356/326; 250/338
[58] Field of Search .................. 356/97, 326; 250/338

[56] References Cited

U.S. PATENT DOCUMENTS

| 654,630 | 7/1900 | Hayes et al. | 250/338 |
| 2,115,578 | 4/1938 | Hall | 250/338 |
| 2,557,096 | 6/1951 | Golay | 250/338 |
| 2,583,221 | 1/1952 | Martin | 250/338 |
| 3,911,276 | 10/1975 | Bell | 356/97 |

OTHER PUBLICATIONS

"Analytical Optoacoustic Spectrometer"; *The Analyst;* Feb. 1976; vol. 101 #1199; Adams et al.; pp. 73–85.
"American Institute of Physics Handbook"; Third Edition; 1975, McGraw-Hill, Inc., pp. 6-75 & 6-75.
"A New Receiver of Radiant Energy"; Hayes, Rev. of Sci. Inst.; vol. 7, May 1936, pp. 202–204.

*Primary Examiner*—Vincent P. McGraw

[57] ABSTRACT

Electromagnetic radiation is detected, using a photoacoustic cell employing a uniform absorber of radiation which absorbs independently of wavelength.

13 Claims, 7 Drawing Figures

BLOCK DIAGRAM OF PHOTOACOUSTIC POWER METER

BLOCK DIAGRAM OF PHOTOACOUSTIC POWER METER

CROSS SECTIONAL VIEW
OF PHOTOACOUSTIC CELL ASSEMBLY

DIAGRAMMATIC REPRESENTATION OF PHOTOACOUSTIC CELL

VARIATION OF PHOTOACOUSTIC
INTENSITY WITH CHOPPING FREQUENCY $(f_0)$

COMPARISON OF RADIOMETER POWER SPECTRUM FOR 1000 $WH_e/X_e$ LAMP AND PHOTOACOUSTIC SPECTRUM USING CARBON BLACK AS THE UNIFORM ABSORBER

COMPARISON OF RADIOMETER POWER SPECTRUM FOR 1000 Xe LAMP AND PHOTOACOUSTIC SPECTRUM OF CARBON BLACK

PHOTOACOUSTIC METHOD AND APPARATUS FOR MEASURING INTENSITY OF ELECTROMAGNETIC RADIATION

FIELD OF THE INVENTION

This invention relates to a method of measuring electromagnetic radiation. In one aspect it relates to a method of measuring the intensity of a particular wavelength. In another aspect it relates to the measurement of the integrated intensity of any electromagnetic radiation source, either pulsed or nonpulsed. In still another aspect, it relates to an improved detector of the intensity of electromagnetic radiation.

BACKGROUND OF THE INVENTION

It is often desirable to be able to ascertain the intensity of a source of electromagnetic radiation as a function of wavelength, and this is one problem addressed by this invention. Other problems which are dealt with here involve the need to investigate electromagnetic radiation sources of high dynamic range (or intensity range), as well as the need to investigate those having a very broad range of wavelengths. Also, the need to determine the total intensity of any electromagnetic radiation source is addressed here.

Certain instruments and techniques have been used to attempt to solve these problems. These solutions have included using calibrated thermopiles, chemical actinometry, and phototubes. Such prior art solutions to these problems have had various deficiencies, however. The necessary equipment is expensive and has involved using sophisticated and expensive techniques, including various techniques which have been required to calibrate the equipment. Furthermore, the wavelength region and the range of intensities which can be investigated with one set of equipment are often quite limited. Therefore, investigating both high and low intensity electromagnetic radiation sources having wavelengths even in the relatively limited range from vacuum UV to far IR has been inconvenient because various pieces of equipment have had to be employed and various calibrations have had to be done.

The photoacoustic effect has been known since 1880, when it was discovered by Alexander Graham Bell. It consists of illuminating a sample contained in a closed gas-filled cell with chopped light and measuring the resultant acoustic signal. The energy absorbed by the sample is degraded to heat pulses which express themselves in the gas contained in the cell (i.e., the coupling gas) as pressure pulses, (i.e., sound). It has been clearly shown that the intensity of the photoacoustic signal is directly proportional to the power of the radiation incident on the sample. (See Rosencwaig, *Opt. Commun.*, 7, 305 (1973) and Harshbarger and Robin, *Accts. Chem. Res.*, 6, 329 (1973)). These sound signals can be detected by a sensitive microphone and have been used to furnish a variety of types of information about samples (either solids, liquids, or gases) placed in the photoacoustic cell but it has not been recognized that the instrument can be used to analyze the light source.

The present invention employs the photoacoustic effect in an instrument which has outstanding capabilities for analyzing electromagnetic radiation.

It is an object of this invention to measure the intensity of electromagnetic radiation. Another object of this invention is to provide a photoacoustic electromagnetic radiation detecting apparatus.

SUMMARY OF THE INVENTION

According to the invention, a photoacoustic cell containing an absorber of radiation which absorbs substantially independently of wavelength is used to provide an improved detector of electromagnetic radiation. Also, according to the invention, carbon black is used as the uniform absorber for a photoacoustic cell.

An electromagnetic radiation detector (or power meter) employing carbon black as the uniform absorber has been found useful for analyzing light samples having wavelengths within the range from vacuum ultraviolet (about 200 nm) to far infrared (about 10,000 nm). The wavelength range of light which can be studied with the present invention is limited only by the properties of the uniform absorber chosen and by the peripheral equipment associated with the photoacoustic cell, (e.g., wavelength filtering, lens absorption, gas molecule interference, etc.). The power meter can be conveniently and economically used for a very broad range of wavelengths and intensities to measure the intensity of sample light sources or of other electromagnetic radiation sources, both pulsed and non-pulsed. These and other advantages of the invention will become apparent from the following description and from the accompanying drawings.

DESCRIPTION OF THE DRAWINGS

Referring to the drawings, FIG. 1 shows a light beam 109 emitted from sample lamp 110. This beam is focused by lens 110A and passed through chopper 111, resulting in a modulated or pulsed beam. Filter 110B can optionally be used to reduce infrared heating of the monocromator 112. The pulsed beam is then passed into monochromator 112, which can be used to select for analysis an individual wavelength of the incident light beam. In this invention, chopper 111 and monochromator 112 can be interchanged in their positions. A plane mirror 112A can optionally be used to change the direction of the light beam. The modulated, monochromatic light beam is then passed into the photoacoustic cell 113. Microphone 114 and preamplifier 115 convert the sound waves produced to a proportional electrical signal which can be prefiltered by a selective amplifier 115A and then coupled to the lock-in amplifier 116. To minimize the influence of noise and other extraneous effects on the measurements, it is advantageous to use a lock-in amplifier 116 to provide synchronous detection. To this end, the action of chopper 111 and the gating of amplifier 116 are synchronized as shown schematically by line 125. Ways of achieving the desired synchronism are familier to a worker in the art and therefore will not be discussed in detail. The recording system can consist of an analog recorder 117 or a multi-channel analyzer 118, the output of which can be plotted directly on the stepping recorder 119, printed in digital form using a digital printer 120, or punched onto paper using a paper punch 121.

In FIG. 2, a pulsed light beam 211 enters the photoacoustic cell through quartz window 212, passes through cavity 213 and impinges on the uniform absorber 214. "O"-rings 215 seal cavity 213, cavity 221, and closed volume 217. The diaphragm of microphone 216 extends across one wall of cavity 221. The output of microphone 216 is conducted through closed volume 217 to preamplifier 218. Coaxial cable 219 connects preamplifier 218 with lock-in amplifier 116 as shown in FIG. 1. Electrical shielding of the microphone and preamplifier is effected by virtue of their being contained within metal housing 220.

In FIG. 3, pulsed light beam 311 is shown entering quartz window 312. Cavity 313 contains uniform absorber 314 as shown. Emitted sound signals pass through slot 322 into cavity 321 and are detected by microphone diaphragm 320.

Chopper 111 is needed only for non-pulsed light sources, and monochromator 112 is used only when electromagnetic radiation intensity as a function of wavelength is desired.

Figure 1:
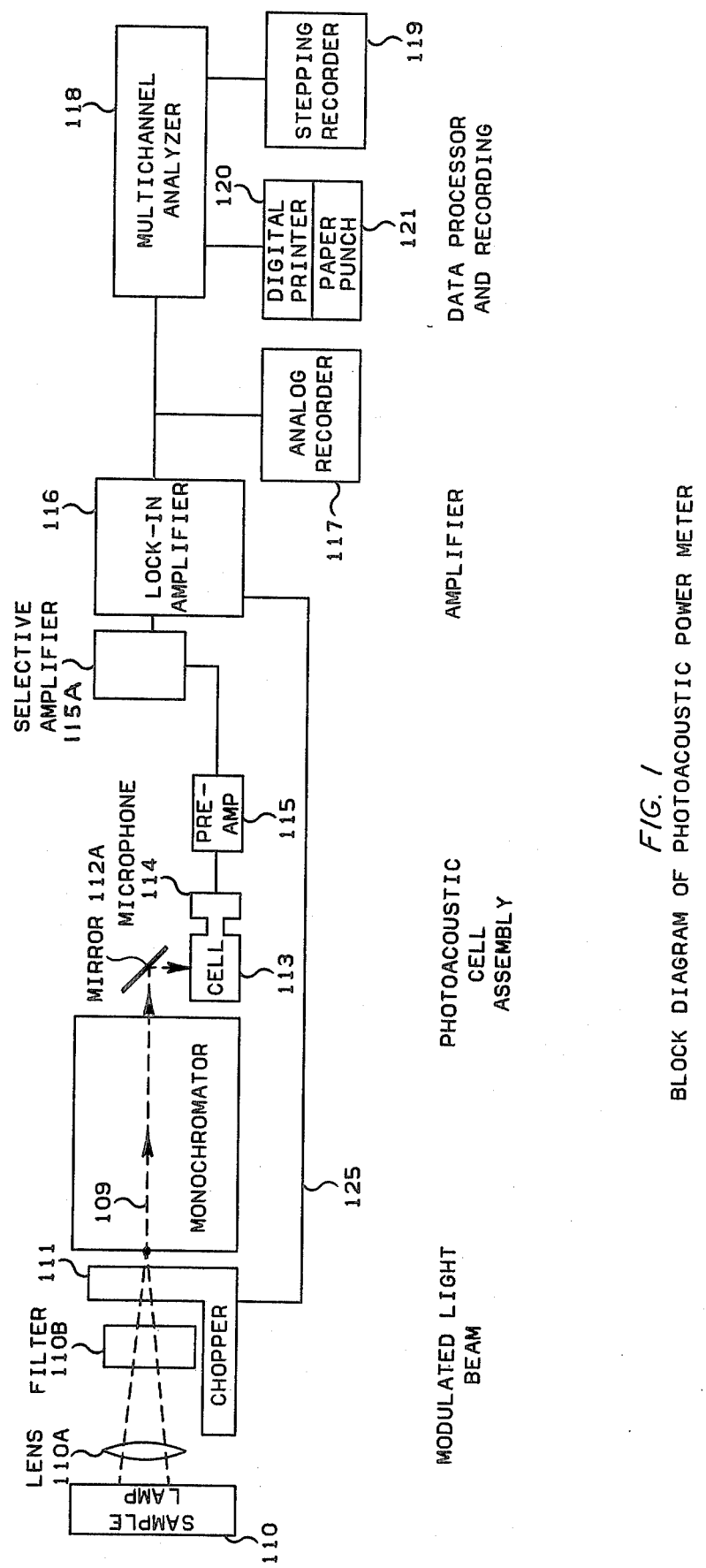
FIG. 1 is a block diagram of a photoacoustic power meter according to the invention.

To obtain the integrated intensity of an electromagnetic radiation source for all wavelengths, one uses the same elements as those shown in FIG. 1 with the exceptions of monochromator 112 and filter 110B.

The elements as shown in FIG. 1 are used to provide a system, which itself must satisfy several requirements. The entire photoacoustic signal ideally should result only from the photoacoustic effect. Therefore, it is required that the system be isolated from extraneous mechanical vibrations; and, therefore, the cell itself should be shock mounted, the preamplifier should be rigidly mounted and the entire system should be mounted on a vibration-reduced table. We have found that this procedure results in a reduction of noise level by a factor of 3.

The photoacoustic cell 113, including the sound detector 216, must also be shielded from extraneous light to prevent spurious sound signals from resulting.

It is also desirable that the readings be reproducible, so the cell 113 should be held in a fixed position.

Large and rapid environmental temperature variations around the system could also be an important factor in the validity of the inventive power meter readings. Therefore, large temperature changes should be prevented, especially when they are not uniform over the system.

The pulsed light beam 211 must be focused on the uniform absorber 214 in the photoacoustic cell 113 to prevent unnecessary scattering of light and to maximize the signal-to-noise ratio (S/N). A lens is preferably used for this purpose.

The photoacoustic cell 113 must itself satisfy various requirements. To achieve the advantages of this power meter, including a very broad wavelength range as well as a very broad dynamic range (or range of intensity) with one set of apparatus, one must use a uniform electromagnetic radiation absorber as the absorber 214 in the photoacoustic cell 113. (A "uniform absorber" is defined here as an absorber which absorbs substantially independently of the wavelength of the incident radiation). We have found that carbon black satisfies this requirement.

Any carbon black can be used in the invention, such as furnace blacks, channel blacks, and color blacks. The carbon black should be selected so as to achieve a maximum S/N in the photoacoustic cell. It should also, preferably, be free of impurities.

Structure is measured by $cm^3/100$ g per 24M4 DBP absorption test (described in ASTM D3493-76); specific surface area (SSA) is measured by $m^2/g$ per CTAB absorption test, as described in J. Janzen and G. Kraus, Rubber and Chemical Technology 44, 1287 (1971); and bulk density is weight per unit volume.

The intensity of the photoacoustic signal has been found to vary directly with the "structure" of the carbon black, inversely with the bulk density of the carbon black, and inversely with the specific surface area of the carbon black. Data supporting these conclusions are shown in Tables I and II.

Table I

PHOTOACOUSTIC INTENSITY
FOR CONSTANT STRUCTURE CARBON BLACKS

A. SERIES A, 24M4 = $0.926 \pm 0.006 \frac{cm^3}{g}$ (chopping frequency = 400 Hz)

| Carbon Black Number | a SSA ($m^2/g$) | b Intensity (mV) |
|---|---|---|
| 1 | 79.4 | 2.51 (0.05) |
| 2 | 84 | 2.48 (0.02) |
| 3 | 96.3 | 2.34 (0.01) |
| 4 | 96.8 | 2.41 (0.01) |
| 5 | 98.2 | 2.41 (0.05) |
| 6 | 98.8 | 2.42 (0.02) |
| 7 | 100.1 | 2.34 (0.03) |
| 8 | 101.1 | 2.39 (0.04) |
| 9 | 114.4 | 2.41 (0.02) |
| 10 | 117.3 | 2.24 (0.02) |

B. SERIES B, 24M4 = $0.944 \pm 0.012 \frac{cm^3}{g}$ (chopping frequency = 60 Hz)

| | | |
|---|---|---|
| 11 | 77.2 | 98.2 (2.5) |
| 12 | 81.5 | 97.1 (1.9) |
| 13 | 97.6 | 97.4 (1.8) |
| 14 | 101.0 | 96.1 (1.4) |
| 15 | 122.2 | 91.1 (3.0) |
| 16 | 127.6 | 93.8 (1.6) | a CTAB absorption surface area
b Data represents averge of four separate observations except for 1, 5, 6, and 7 for which three observations were made. Values in parentheses represnt one standard deviation from the average.

In Table I, "structure" and chopping frequency are held constant while SSA is varied for two series of carbon blacks (labeled series A and B). The data in Table I show that intensity of the photoacoustic signal varies inversely with SSA.

Table II

| Photoacoustic Intensity for Constant SSA Carbon Blacks | | | | |
|---|---|---|---|---|
| Carbon Black Number | SSA ($m^2/g$) | "Structure" 24M4 ($cm^3/g$) | Bulk Density ($g/cm^3$) | Intensity[a] (mV) |
| Group I | | | | |
| 17 | 23.6 | 0.3 | 1.19 | 91.7 (0.7) |
| 18 | 22.6 | 0.7 | 0.806 | 101.4 (2.8) |
| Group II | | | | |
| 19[b] | 96.4 | 0.747 | 0.777 | 93.3 (1.3) |
| 20[b] | 98.7 | 0.825 | 0.732 | 96.4 (1.1) |
| 21[b] | 95.4 | 1.016 | 0.642 | 97.1 (1.0) |

Table II-continued

| Photoacoustic Intensity for Constant SSA Carbon Blacks | | | | |
|---|---|---|---|---|
| Carbon Black Number | SSA (m²/g) | "Structure" 24M4 (cm³/g) | Bulk Density (g/cm³) | Intensity[a] (mV) |
| 22[b] | 96.6 | 1.163 | 0.587 | 98.4 (0.7) |

[a]Values in parentheses are one standard deviation averge averge of at least four observations.
[b]Results for these blacks represent an average of eight observations from two separate specimens.

In Table II, SSA is approximately constant for the samples in each of the two groups of samples, labeled Group I and Group II. The data demonstrate that intensity varies inversely with bulk density and varies directly with "structure".

Of the many forms of carbon black available with various values of structure, SSA, and bulk density, we have found that carbon black having a small SSA (from about 20 to about 700 m²/g), high structure (from about 0.3 to about 3 cm³/100 g) and low bulk density gives best results in the practice of the invention and therefore is preferred. Even more preferred is carbon black having an SSA within the range of about 20 to about 120 m²/g, having "structure" within the range of about 0.7 to about 1.2 cm³/100 g and being in the form of a loose powder. We have found that carbon black in the form of a loosely packed powder lying horizontally, as opposed to a pellet held vertically, will provide a better S/N. This corresponds to our finding of the inverse dependence of intensity on bulk density. When the carbon black is in the form of a powder lying horizontally, a mirror would preferably be used to change the direction of the incident electromagnetic radiation from horizontal to vertical.

To maximize S/N, the volume of the photoacoustic cell 113 should be as small as practicable. The cell should be large enough to accommodate the microphone 116 and pre-amplifier 118, but not larger. Table III shows the effect of cell volume on the intensity of the photoacoustic signal from a carbon black sample.

Table III

| Effect of Cell Volume ($V_i$) On The Intensity ($I_i$) Of The Photoacoustic Signal From Carbon Black[a] | |
|---|---|
| $V_i/V_o$[b] | $I_o/I_i$[b] |
| 2.4 | 2.2 |
| 2.1 | 1.7 |
| 2.0 | 2.1 |
| 1.7 | 1.5 |
| 1.6 | 1.6 |
| 1.5 | 1.4 |
| 1.4 | 1.7 |
| 1.3 | 1.4 |
| 1.2 | 1.4 |

[a]Volumes and intensities given relative to values at $V_o$, the minimum volume in a variable path length cell with intensity $I_o$.
[b]Uncertainty in $V_i/V_o$ is approximately ± 0.1; uncertainty in $I_o/I_i$ is approximately ± 0.2.

The data in Table III show that the photoacoustic signal intensity is approximately inversely proportional to the cell volume. Therefore, to maximize S/N, the cell volume should be as small as possible.

Figure 3:
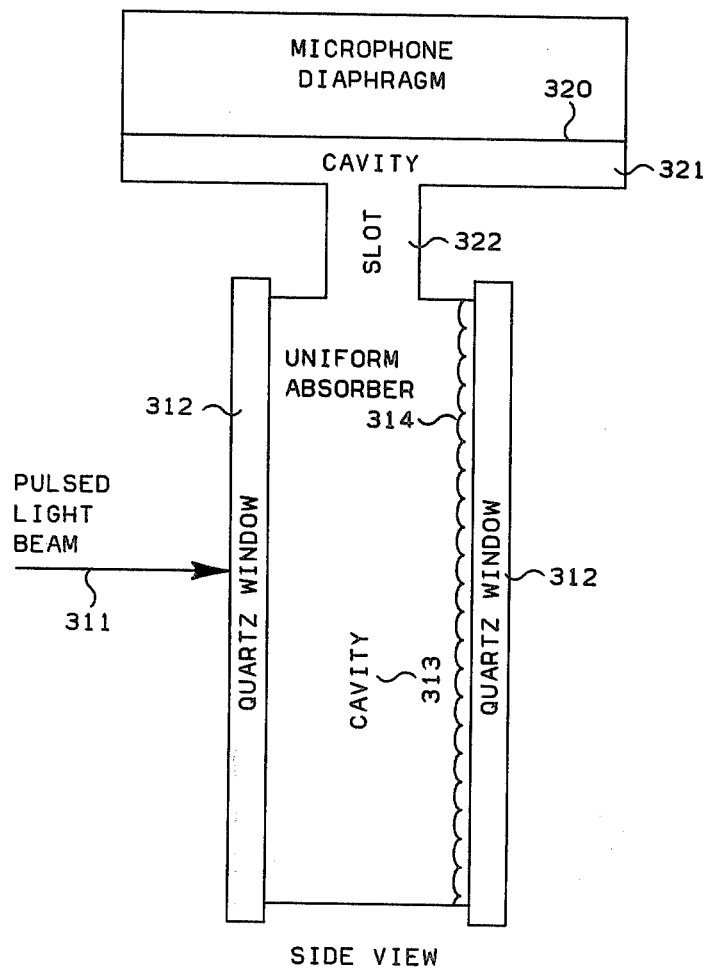
FIG. 3 is a diagrammatic representation of a photoacoustic cell of FIG. 2.

The shape of the photoacoustic cell 113 has not been found to be a critical factor in the power meter when the volume of the cell is as small as practicable. However, for convenience in insertion of the uniform absorber and for minimizing the effect of airborne noise, two thin wafer-shaped cavities 313 and 321 can be connected in a T-shaped configuration, as shown in FIG. 3. There, 0-rings 215 seal and separate the microphone 216 and cell cavities 313 and 321 above and below the microphone diaphragm 320. This arrangement prevents airborne noise from reaching either side of the diaphragm. Valves (not shown) are used to equalize and control cavity pressures during cell assembly and operation, and they also provide a means for changing the composition of the coupling gas (i.e., the background gas contained in cavities 313 and 321 in the cell).

Figure 2:
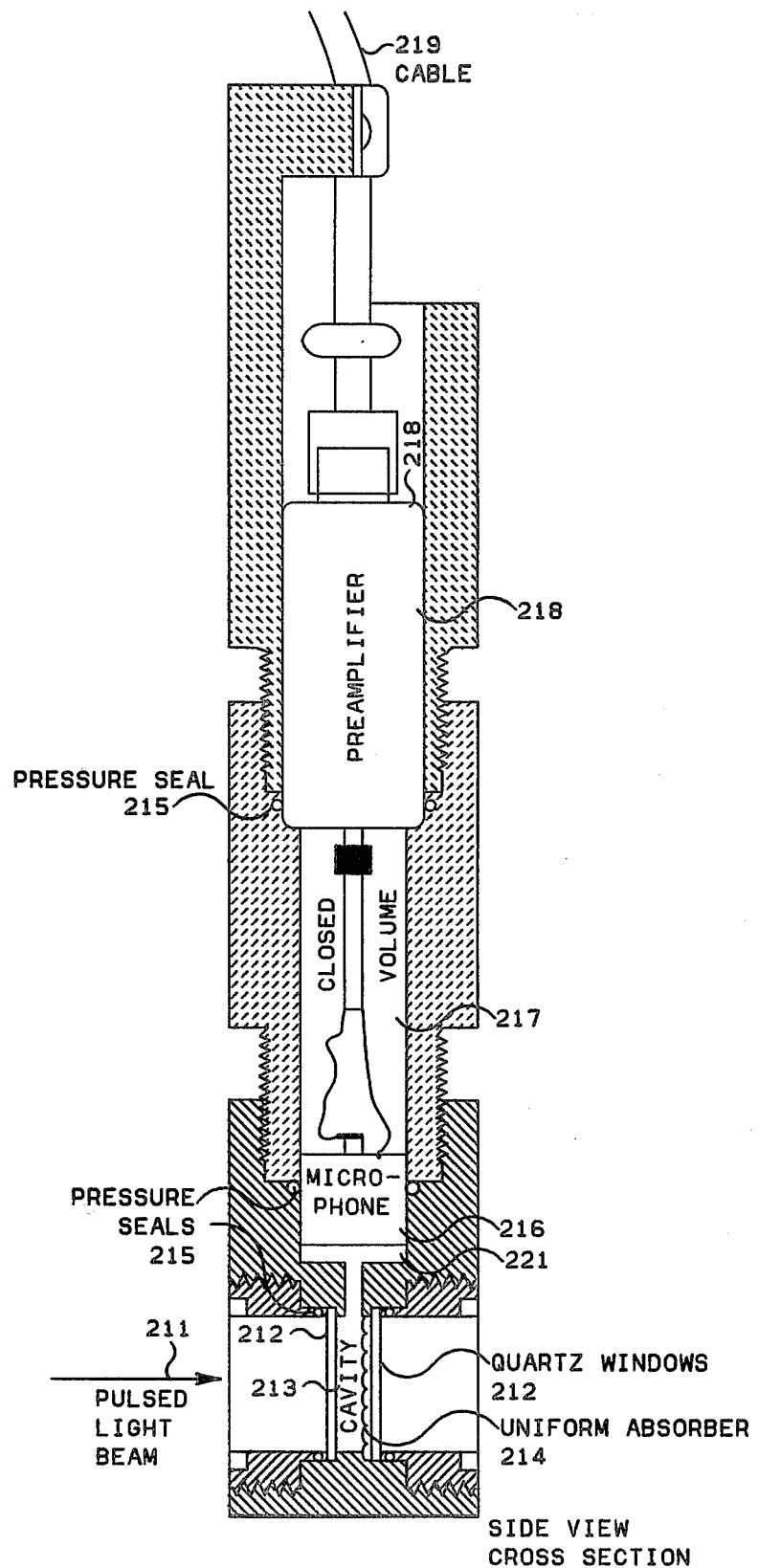
FIG. 2 is a cross-sectional view of a photoacoustic cell assembly for use in the meter of FIG. 1.

The cell walls (shown as made of quartz in FIGS. 2 and 3 (212 and 312)) should be made of material which is a uniform transmitter of light (transmitting substantially independently of wavelength of incident radiation). Quartz can be used as the cell material for most wavelengths. However, in the infrared region, with wavelengths in the range from about 10 microns to about 1 mm, lithium fluoride is preferred since it (unlike quartz) transmits well in that region. Windows 212 are sealed with O-rings (pressure seals) 215 held in place by threaded retainer rings for easy cleaning and changing.

The coupling gas used in the photoacoustic cell 113 is an important factor in the power meter. In the wavelength region of vacuum ultraviolet (about 200 nm), the system must be flushed of oxygen since oxygen absorbs light in that region. It has been found that the photoacoustic intensity is very sensitive to the thermal conductivity and heat capacity of the coupling gas, with the noise level being somewhat less sensitive to these properties. Data in Table IV show that, of the gases tested, helium gave the largest photoacoustic signal.

Table IV

| The Photoacoustic (PA) Signal Intensity for a Carbon Black with Various Coupling Gases Using a 1 KW Hg/Xe Lamp | | | |
|---|---|---|---|
| Coupling Gas | Thermal Conductivity[a] (cal sec⁻¹ cm⁻¹ °C.⁻¹ × 10⁻⁶) | $C_v$° (298° K.)[b] (cal/deg mole) | Normalized PA[c] Intensity (mV) |
| He | 360.4 | 2.98 | 2.85 |
| Ne | 115.7 | 2.98 | 1.61 |
| Ar | 42.6 | 2.98 | 1.08 |
| $O_2$ | 63.6 | 5.03 | 1.01 |
| Air | 62.2 | 5.0 | 1.00 |
| $N_2$ | 62.4 | 4.97 | 0.96 |
| $CH_4$ | 81.8 | 6.55 | 0.88 |
| $CO_2$ | 39.7 | 6.89 | 0.81 |
| Xe | — | 2.98 | 0.78 |
| $C_2H_4$ | 49.2 | 8.42 | 0.70 |
| $C_2H_6$ | 51.2 | 10.60 | 0.62 |

[a]From Handbook of Chemistry + Physics, 51st Ed., p. E-2, Values given are for 26.7° C.
[b]Heat capacity at constant volume from Selected Values of Chemical Thermodynamic Properties, NBS Circular 500, Part 1.
[c]The values are normalized relative to an intensity of 1.0 mV for air.
[d]Carbon black sample No. 1, which had an SSA of 79.4 m²/g, bulk density of 0.677 g/cc, and "structure" of 93.6 cm³/100 g.

The detector 216 used to detect the emitted sound waves should be a very sensitive microphone, such as an electret microphone. The detector is connected to a preamplifier 218, which in turn is preferably connected to a selective amplifier 115A. Selective amplifier 115A prefilters the microphone signal, acting as a resonance-pass filter set at the modulation frequency. The preamplifier and cable 219 should be rigidly mounted and shielded to minimize mechanical vibrations from reaching the microphone and to prevent pickup of electrical interference at the input to the amplifier 116. The detector 216 can be replaced in the photoacoustic cell 113 with a condenser type microphone.

The carbon black powder 214 can be placed in a cup for convenience in handling the powder, or the powder can be placed directly on the cell bottom. "Backing" material is defined as the material which contacts the absorbing material. It is desired that the backing material not contribute to the photoacoustic signal. It has been found that if the layer of carbon black 214 is sufficiently thick, the produced photoacoustic signal is virtually totally independent of the backing material.

It has also been found that when a chopper 111 is employed, the lower the chopping frequency, the thicker the absorbing material must be to eliminate the effect of the backing material on the photoacoustic signal.

Spurious contributions to signal because of reflection from the walls of the cell should be avoided by focusing the light beam 211 on the uniform absorber 214.

A rotating perforated wheel chopper or tuning fork chopper 111 or other source of pulses must be used when the light source is nonpulsed. It has been found that the rotating perforated wheel chopper 111 will itself produce a spurious signal detectable with the photoacoustic cell 113. This effect is minimized by using a rotating perforated wheel chopper 111 with a large number of holes or slits and with a low rotational speed.

Figure 4:
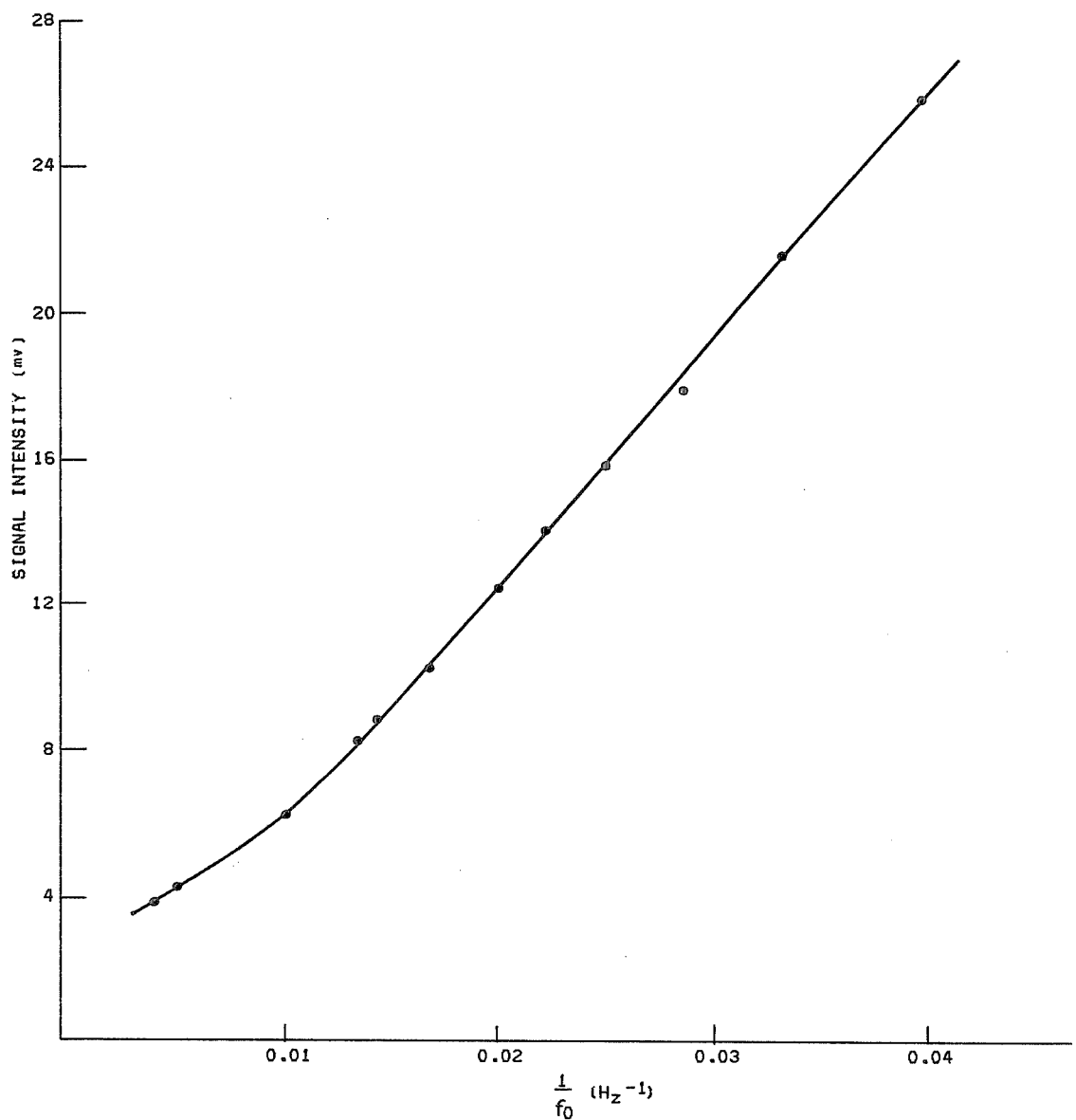
FIG. 4 is a graph of intensity of a produced photoacoustic signal versus the reciprocal of the chopping frequency used.

It has been found that the photoacoustic intensity varies inversely with the chopping frequency. FIG. 4 shows this effect. The data were obtained using the full output from a 1000 W Xe lamp and a 6 slot chopper wheel. A plot of photoacoustic intensity vs. $1/f_o$, where $f_o$ is the chopper frequency, is approximately linear at the lower frequencies. At the higher frequencies, for this 6 slot chopper wheel, the nonlinearity seen in FIG. 4 occurs because of the spurious signal introduced by the chopper itself.

If the light source is already pulsed, such as a pulsed laser, chopper 111 is not required. In that case, the lock-in amplifier 116 would be gated by the same trigger pulse as is used to trigger the laser emission.

A monochromator 112 is used when a spectrum of relative intensity as a function of wavelength is desired, rather than total intensity. It is well known that the transmission efficiency of a grating monochromator varies with wavelength. If the absolute intensity of the radiation source is desired, a correction for the above-mentioned variation in the monochromator must be made. However, when the power meter is used to determine the number of photons impinging on the carbon black 214, the correction for the variation of transmission efficiency of the monochromator is not needed.

A selective amplifier 115A is preferably used to prefilter the microphone signal before it is transmitted to lock-in amplifier 116. A suitable selective amplifier would be, for example, a PAR 189 selective amplifier.

A lock-in amplifier 116 measures the microphone signal component which is in phase with the pulsed light beam. It is locked in to a reference signal from the tuning fork chopper or variable speed chopper 111. An example of a suitable lock-in amplifier is the Princeton Applied Research, 2-Phase/Vector, Model 129A.

The data collection system for recording the spectrum of intensity versus wavelength can record amplitude of the photoacoustic signal as analog signals as a function of wavelength. The analog signals can be digitized and stored in a multichannel analyzer 118, such as in a Fabritek multichannel analyzer in 1024, 2048, or 4096 channels. The output can then be plotted directly on a stepping recorder 119, printed in digital form using a digital printer 120, or punched onto a paper tape using a paper punch 121.

In the following examples, a light source was analyzed by using the inventive power meter and by using an International Light Radiometer Model IL 500. The light source in both cases was a Oriel C-60-50 Universal arc lamp with a 1000 watt mercury/xenon lamp.

EXAMPLE I

The power meter was constructed having the relative positions of the elements as shown in FIG. 1 with the elements of the photoacoustic cell situated as shown in FIG. 2. Downstream from the light source, a water filter made of a mixture of $H_2O$ and $D_2O$ was positioned 2 cm. from the monochromator to reduce infrared heating of the monochromator.

No lens was used in this example power meter, although use of a lens is preferred.

The chopper which was used was a Princeton Applied Research Variable Speed Chopper Model 192; and it was positioned downstream from and adjacent to the filter. The chopping frequency was 400 Hz, and the chopper had 20 slots and a rotational speed of 1200 RPM.

A monochromator was positioned downstream from and adjacent to the chopper. The monochromator used was a GCA/McPherson, Model EU 700 with a grating blaze of 250 nm.

Adjacent to and downstream from the monochromator was the photoacoustic cell assembly. The photoacoustic cell had a volume of about 10 cubic centimeters.

The coupling gas in this example photoacoustic cell was helium.

Carbon black in the preferred form of a loose powder was not used in constructing the example power meter because knowledge of that preference was gained at a later date. Instead, carbon black (held in a vertical position) on Millipore paper as the backing material was used as the uniform absorber in the photoacoustic cell. No sample cup nor mirror was used.

The carbon black used had a SSA of 114.4 $m^2/g$, bulk density of 0.681 $g/cm^3$, and "structure" of 0.928 $cm^3/g$. The uniform absorber was prepared by ultrasonically dispersing (into essentially all primary aggregates) 5 mg of black in 100 ml of 0.01 molar Aerosol OT solution (an anionic surfactant, sodium dioctylsulfosuccinate, manufactured by the American Cyanamid Co.) and filtering 10 ml of the resulting suspension through a 25 mm filter. The area of the uniform absorber was 4.1 $cm^2$ with an approximate thickness of $1.5 \times 10^{-4}$ cm.

The two thin wafer-shaped cavities 313 and 321 were connected in a T-shaped configuration, as shown in FIGS. 2 and 3.

The cell walls were made of quartz windows, which were about 4 mm thick.

The microphone used was a one-inch electret, General Radio, Model 1961.

The preamplifier was an Ithaco, Model 144L, with gain set at 100.

Other than the aluminum housings surrounding the microphone and pre-amplifier, no extra shielding was used in constructing the example power meter, although additional electrical and sound shielding is preferred.

The cable 219 which connected the pre-amplifier 218 and lock-in amplifier 116 was of type RG 58A/U and of length about 6 feet. Two standard BNC connectors were used to connect the cable to the preamplifier and lock-in amplifier.

The lock-in amplifier was a PAR, 2-Phase/Vector, Model 129A. The gain was set at unity.

No recording instrument was used to record the intensity readings as a function of wavelength. Instead, these were manually recorded and were then graphed.

The entire optical system (including the radiation source, the chopper, the monochromator, and infrared filter) was mounted on an aluminum base plate having dimensions 25.4 cm × 152 cm × 1.27 cm.

The example power meter was not mounted on a special vibration-reduced air table, although such mounting is preferred.

Figure 5:
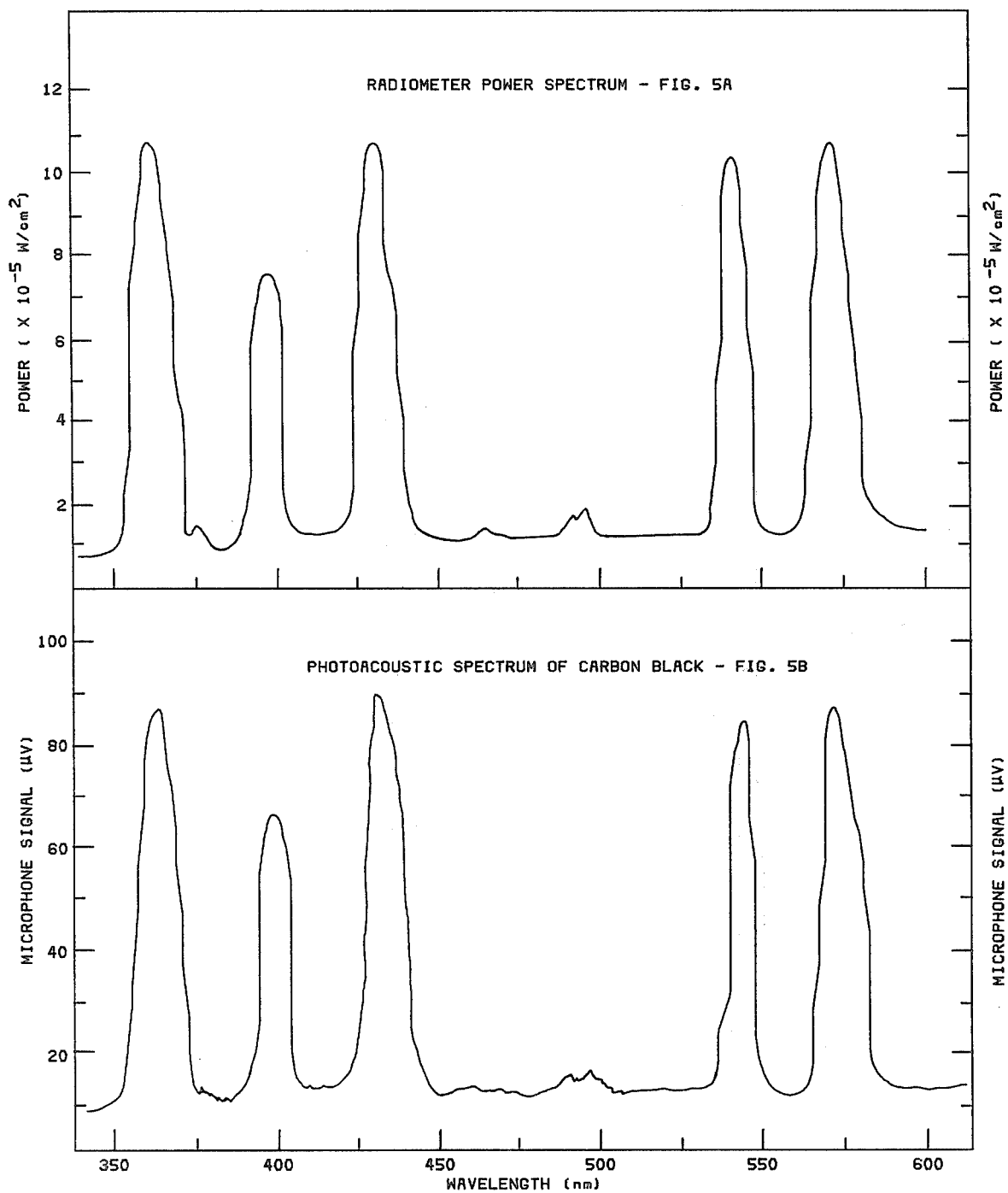
FIG. 5A is a corrected power spectrum obtained by using a commercially available radiometer.
FIG. 5B is a power spectrum obtained without correction by using the power meter of the invention. The light source for both FIGS. 5A and 5B was a 1000 watt mercury/xenon lamp.
Figure 6:
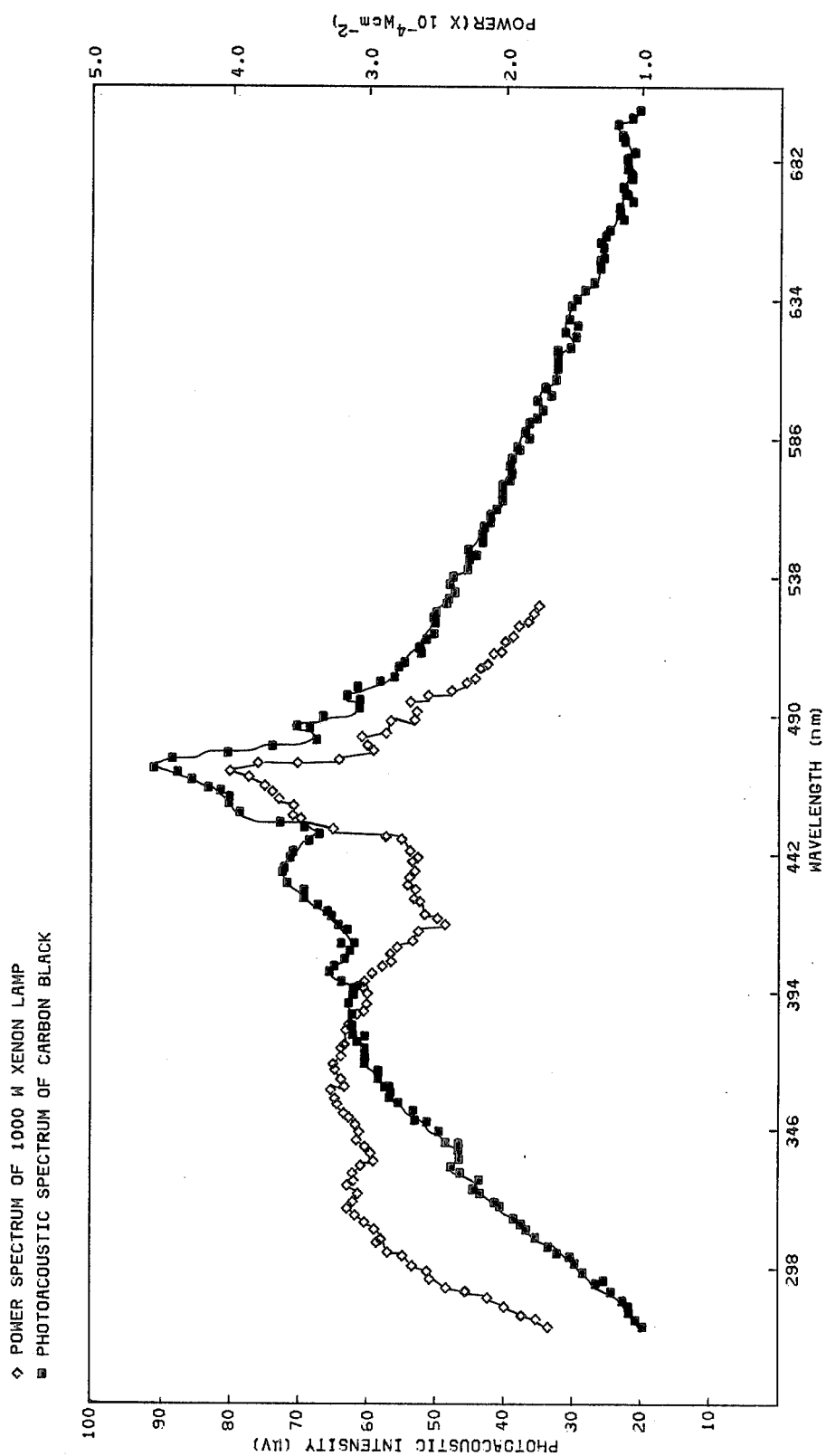
FIG. 6 is a corrected radiometer spectrum and an uncorrected spectrum of the meter of the invention, where the light source for both spectra was a 1000 watt xenon lamp.

Despite the many discrepancies between the preferred aspects of the power meter and what was actually used in constructing the example power meter, excellent results were obtained with the example power meter. FIG. 5B shows a spectrum of relative intensity as a function of wavelength that was obtained directly (without any corrections for variations in the instrument) with the inventive example power meter, using a 1000 watt mercury/xenon lamp. The shaded graph in FIG. 6 shows a spectrum obtained with the example power meter, using a 1000 watt Xe lamp.

EXAMPLE II (Control)

For a prior art comparison, an International Light Model IL 500 radiometer was also used to analyze the same 1000 watt Hg/Xe lamp and the same 1000 watt Xe lamp that were analyzed with the inventive power meter.

The equipment used with the radiometer was identical to that used with the inventive power meter, except that the photoacoustic cell assembly (which includes the preamplifier and microphone) was replaced by the detector head of the radiometer.

No changes were made in the radiometer after it was purchased.

The direct output of the radiometer is not shown since it required a correction for the variation with wavelength of the sensitivity of that instrument. The calibration curve supplied by the radiometer manufacturer showed the response of the instrument as a function of the wavelength of the radiation impinging upon it and gave the percentage of instrument error as a function of wavelength. The manufacturer's directions for the necessary corrections were carefully followed by applicants. For each wavelength, the applicants multiplied the response that was obtained directly with the radiometer by the reciprocal of the percent obtained from the calibration curve. FIG. 5A and the unshaded graph in FIG. 6 show the spectrum of the corrected radiometer response as a function of wavelength.

A comparison of FIGS. 5A and 5B clearly shows the convenience and utility of the present invention as compared with the prior art radiometer apparatus. The wavelength range which was tested was about 200 nm to about 1000 nm; however, the wavelength range which could have been obtained with the example power meter was from about 200 nm to about 10,000 nm, all obtainable with a single instrument with no correction necessary for sensitivity of the instrument.

In FIG. 6, the corrected radiometer spectrum and the uncorrected photoacoustic power meter spectrum are also in very close agreement. However, there are some slight differences, especially below 350 nm. We believe that these differences are due mainly to the uncertainty in the radiometer calibration, rather than due to inaccuracy of the example power meter. Also, FIG. 6 demonstrates that, without signal averaging, signals as low as 20 $\mu v$ can be measured.

If absolute instead of relative intensity is desired, the photoacoustic power meter can be calibrated by using a known standard, such as the spectrum of FIG. 5A.

This invention has been described in detail for purposes of illustration, but it is not to be construed as limited thereby. Rather, it is intended to cover reasonable changes and modifications which would be apparent to one skilled in the art.

I claim:

1. A method of measuring the intensity of a beam of electromagnetic radiation, said method comprising:

(a) passing said beam of electromagnetic radiation into a monochromator and into a chopper in either possible order, thereby producing a periodically pulsed monochromatic beam of electromagnetic radiation having a chopping frequency f;

(b) passing said periodically pulsed monochromatic beam of electromagnetic radiation into a cell which contains carbon black and a gas, at least one wall of said cell being made of a material which transmits electromagnetic radiation substantially independently of wavelength of incident electromagnetic radiation, and said pulsed monochromatic beam of electromagnetic radiation being directed so that it impinges upon said carbon black, thereby producing changes in pressure of said gas located within said cell;

(c) detecting said changes in pressure of said gas located within said cell with a microphone which operates in cooperation with said cell and which has a diaphragm that forms a flexible wall of said cell, said microphone producing electrical signals which are representative of said changes in pressure of said gas located within said cell, each of said electrical signals having a component which is out of phase with said pulsed monochromatic beam of electromagnetic radiation and having a component which is in phase with said pulsed monochromatic beam of electromagnetic radiation;

(d) amplifying said component which is in phase with said pulsed monochromatic beam of electromagnetic radiation with use of a lock-in amplifier which is locked in to the chopping frequency f, thereby producing an amplified signal; and (e) recording said amplified signal, said carbon black being such that it has a specific surface area (SSA, which is measured in $M^2/g$ per CTAB absorption test) within the range from about 20 to about 700 m²/g.

2. A method according to claim 1, wherein said cell contains helium gas.

3. A method according to claim 2, wherein said wavelengths of said electromagnetic radiation beam are in the wavelength range from vacuum UV to far IR and wherein said material which transmits electromagnetic radiation substantially independently of wavelengths of radiation which is passed into said closed cell is lithium fluoride.

4. A method according to claim 3 wherein said carbon black has a "structure" within the range from about 0.3 to about 3 cm³/100 g.

5. A method according to claim 3 wherein said carbon black has a "structure" within the range from about 0.7 to about 1.2 cm$^3$/100 g.

6. A method according to claim 4 wherein said carbon black has a specific surface area within the range from about 20 to about 120 m$^2$/g.

7. An apparatus comprising:
(a) a chopper and a monochromator operating in cooperation with each other, through both of which a beam of electromagnetic radiation is passed in either possible order, thereby producing a pulsed beam of electromagnetic radiation;
(b) a cell which contains carbon black and a gas, at least one wall of said cell being made of a material which transmits electromagnetic radiation substantially independently of the wavelength of incident radiation;
(c) a microphone having a diaphragm which forms one wall of said cell, said microphone operating in cooperation with said cell so as to detect changes in pressure of said gas located within said cell and so as to produce electrical signals which are representative of changes in pressure of said gas located within said cell, each of said electrical signals having a component which is out of phase with the pulsed beam of electromagnetic radiation and having a component which is in phase with the pulsed beam of electromagnetic radiation;
(d) a means for amplifying said components of said electrical signals which are in phase with said pulsed beam of electromagnetic radiation; and
(e) a means for recording said amplified signal, said carbon black having a specific surface area (SSA) within the range from about 20 to about 700 m$^2$/g.

8. An apparatus according to claim 7, wherein said cell contains helium gas.

9. An apparatus according to claim 8, wherein said material which transmits electromagnetic radiation substantially independently of the wavelength of incident radiation in lithium fluoride.

10. An apparatus according to claim 9 wherein said carbon black has a "structure" within the range from about 0.3 to about 3 cm$^3$/100 g.

11. An apparatus according to claim 9 wherein said carbon black has a "structure" within the range from about 0.7 to about 1.2 cm$^3$/100 g.

12. An apparatus according to claim 9 wherein said carbon black has a specific surface area within the range from about 20 to about 120 m$^2$/g.

13. A method according to claim 5 wherein said carbon black has a specific surface area within the range from about 20 to about 120 m$^2$/g.

* * * * *